(12) United States Patent
Westbrooks, Jr. et al.

(10) Patent No.: US 6,315,039 B1
(45) Date of Patent: Nov. 13, 2001

(54) BEDSIDE RETHERMALIZATION UNIT

(75) Inventors: John W. Westbrooks, Jr., Christiana; Sara C. Hurt, Nashville, both of TN (US)

(73) Assignee: Standex International Corporation, Salem, NH (US)

( * ) Notice: Subject to any disclaimer, the term of this patent is extended or adjusted under 35 U.S.C. 154(b) by 0 days.

(21) Appl. No.: 09/436,569

(22) Filed: Nov. 9, 1999

(51) Int. Cl.⁷ .............................. F25B 29/00; F25D 3/06; H05B 3/06

(52) U.S. Cl. .................... 165/201; 165/42; 165/919; 62/457.1; 99/332; 219/387; 219/521; 312/236

(58) Field of Search .................. 165/41, 42, 201, 165/202, 205, 206, 918, 919; 219/385, 386, 387, 520, 521; 312/236; 99/325, 331, 332, 333; 62/457.1, 457.6, 457.9

(56) References Cited

U.S. PATENT DOCUMENTS

| | | | | |
|---|---|---|---|---|
| 3,042,384 | * | 7/1962 | Bauman | 165/42 |
| 3,205,033 | * | 9/1965 | Stentz | 165/919 X |
| 3,908,749 | * | 9/1975 | Williams | 165/919 X |
| 3,965,969 | * | 6/1976 | Williamson | 165/919 X |
| 3,982,584 | * | 9/1976 | Spanoudis | 165/42 |
| 4,110,587 | | 8/1978 | Souder, Jr. et al. . | |
| 4,250,955 | * | 2/1981 | Plattner et al. | 165/918 X |
| 4,775,002 | * | 10/1988 | Iwamoto | 165/919 X |
| 4,781,243 | * | 11/1988 | DeVogel et al. | 165/919 X |
| 4,852,365 | | 8/1989 | Elrod et al. . | |
| 4,884,626 | * | 12/1989 | Filipowski | 165/918 X |
| 5,069,273 | * | 12/1991 | O'Hearne | 165/919 X |
| 5,086,693 | * | 2/1992 | Tippmann et al. | 165/919 X |
| 5,159,973 | * | 11/1992 | Pennington et al. | 165/919 X |
| 5,201,364 | * | 4/1993 | Tippmann et al. | 165/919 X |
| 5,285,051 | * | 2/1994 | DeGrow et al. | 165/919 X |
| 5,403,997 | | 4/1995 | Wimpee et al. . | |
| 5,405,935 | * | 4/1995 | Liebermann | 219/387 X |
| 5,449,232 | * | 9/1995 | Westbrooks, Jr. et al. | 165/919 X |
| 5,454,427 | | 10/1995 | Westbrooks et al. . | |
| 5,466,915 | | 11/1995 | Meier et al. . | |
| 5,628,241 | | 5/1997 | Chavanaz et al. . | |
| 5,655,595 | | 8/1997 | Westbrooks, Jr. . | |

(List continued on next page.)

FOREIGN PATENT DOCUMENTS

| | | | | |
|---|---|---|---|---|
| 2 307 721 | * | 12/1976 | (FR) | 219/387 |
| 2-37222 | * | 2/1990 | (JP) | 219/386 |

Primary Examiner—Ira S. Lazarus
Assistant Examiner—Ljiljana V. Ciric
(74) Attorney, Agent, or Firm—Luedeka, Neely & Graham, P.C.

(57) ABSTRACT

A bedside rethermalization unit maintains food items placed on meal serving trays, including hot food items to be served at an elevated temperature, in a refrigerated state and rethermalizes hot food items at a desired time prior to meal serving. The unit is preferably in the form of a cart with castered wheels to enhance mobility. The cart includes a cabinet having an upper tray storage compartment for storing and rethermalizing a single day's worth of meals for a single individual, and a lower tray storage compartment for storage of soiled trays and eating utensils. Both compartments are refrigerated. A divider physically and atmospherically isolates the upper and lower tray storage compartments to inhibit contamination of uneaten meals in the upper compartment by soiled trays placed in the lower compartment. Rethermalization of hot food items in the upper compartment may be achieved by convection, conduction, induction, radiant heating, or any combination thereof. In one embodiment, the upper tray storage compartment is further divided into a rethermalization compartment, defined by a thermal barrier, with one or more heating elements for rethermalizing hot food items positioned on the meal serving trays. A control panel positioned at the front of the cart provides an indication when the meal is ready to be served.

26 Claims, 8 Drawing Sheets

U.S. PATENT DOCUMENTS

| | | |
|---|---|---|
| 5,771,959 | 6/1998 | Westbrooks, Jr. et al. . |
| 5,797,445 | 8/1998 | Westbrooks, Jr et al. . |
| 5,852,967 * | 12/1998 | Fortmann et al. ............... 165/918 X |
| 5,868,195 | 2/1999 | Westbrooks, Jr. . |
| 5,896,915 | 4/1999 | Westbrooks, Jr. et al. . |
| 5,910,210 | 6/1999 | Violi et al. . |
| 6,105,818 * | 8/2000 | Speranza ......................... 219/386 X |
| 6,120,819 * | 9/2000 | Violi et al. ....................... 219/386 X |

* cited by examiner

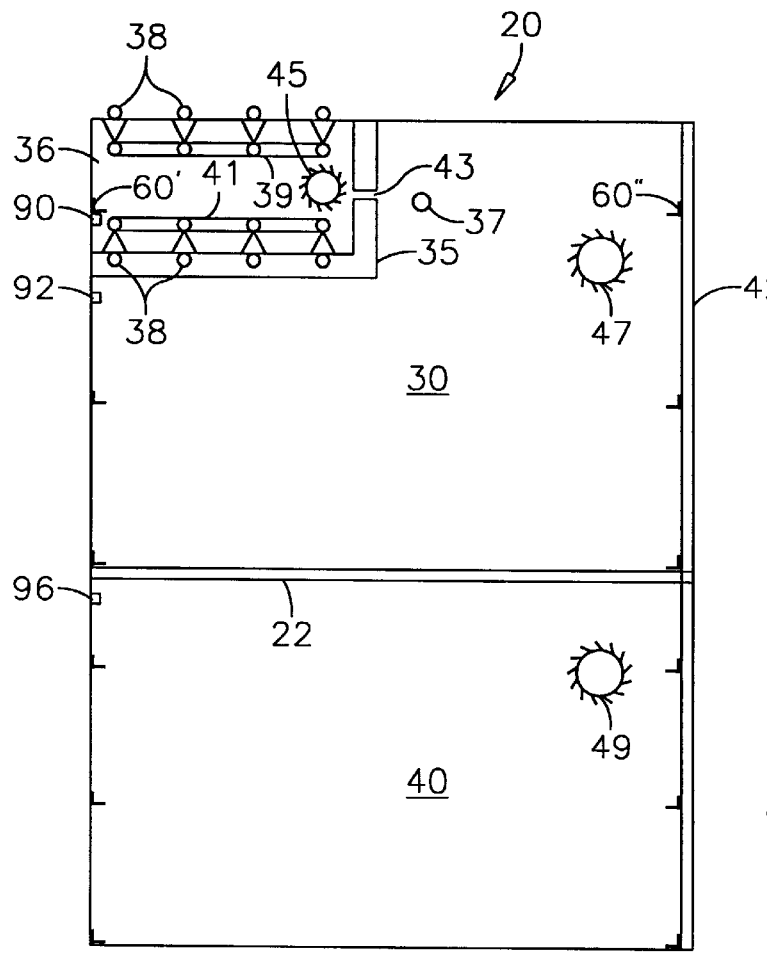
*Fig.* 2
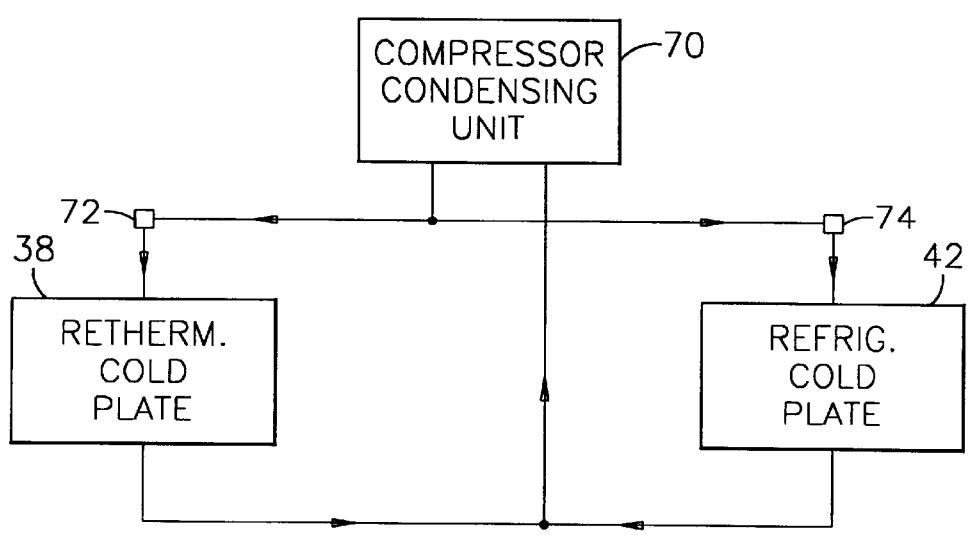
*Fig.* 3

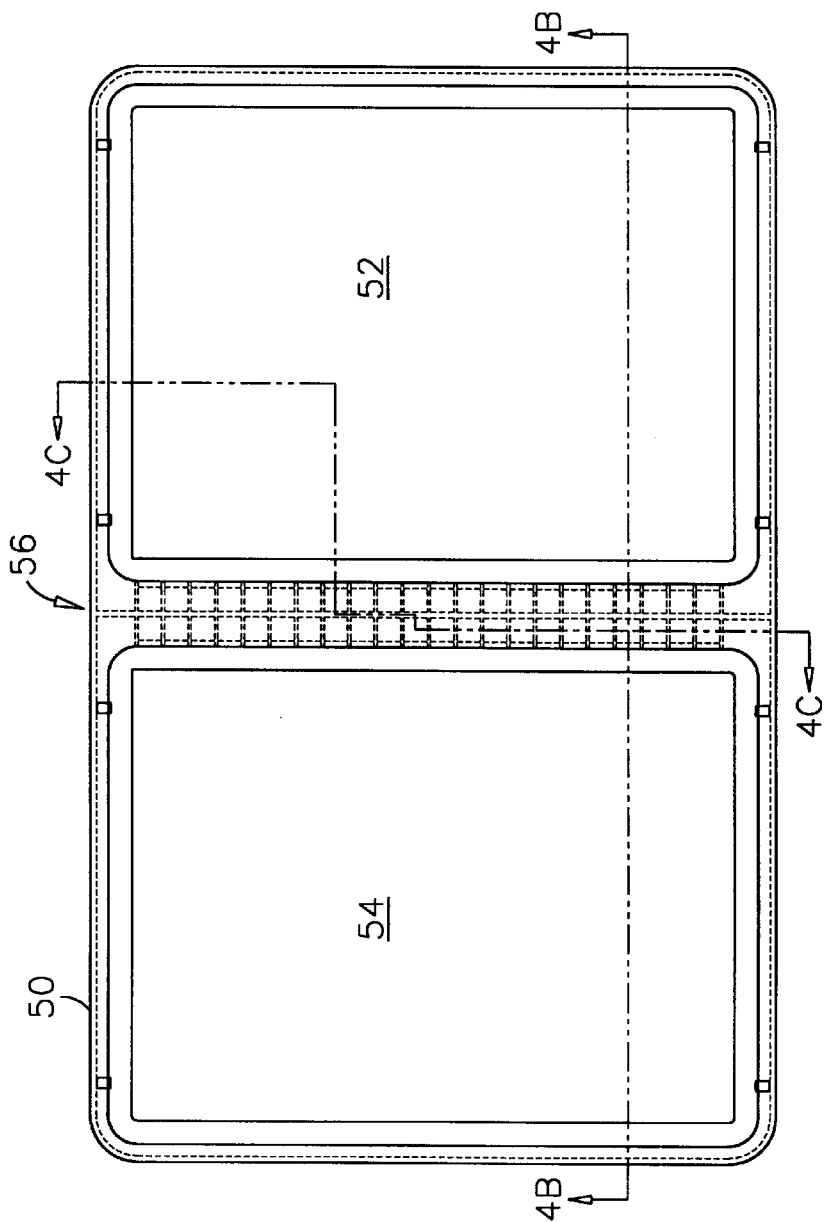
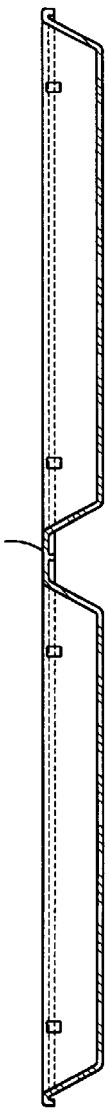
Fig. 4A
Fig. 4B
Fig. 4C

BEDSIDE RETHERMALIZATION UNIT

TECHNICAL FIELD

The present invention relates to refrigerated storage and rethermalization of food. More particularly, it relates to an apparatus for the cold storage and rethermalization of a day's worth of prepared meals for an individual and is sized to be conveniently placed at the bedside of, for example, a hospital patient to whom the meals are to be served.

BACKGROUND

Meal preparation and serving in institutional settings such as hospitals is a labor-intensive effort, requiring a tremendous amount of time and resources to prepare the meals at a remote food preparation area, such as a hospital kitchen, assemble the meals on trays, and then transport the meal trays to the patients' rooms for consumption. Since meals typically include both hot and cold food items, food temperature maintenance presents a significant challenge when large numbers of meals are to be prepared, transported, and served. To assist in this effort, various types of food storage and rethermalization carts have been developed. The carts are typically loaded with prepared meal trays and then transported to a remote site in the general vicinity of where the meals are to be served. At meal serving time, servers remove the trays from the cart and carry the trays to individuals in their rooms where the meals are consumed. After the meals are eaten, the soiled trays, dishes, and leftover food items are collected, placed back in the cart, and the cart is taken back to the hospital kitchen where the soiled trays are removed for cleaning. This labor intensive process is then repeated for the next meal of the day.

SUMMARY

What is needed, therefore, is a meal storage and rethermalization unit which is sufficiently large to hold a day's worth of meals yet sufficiently small to be placed in the immediate vicinity of a patient so that each meal of the day can be efficiently served to the patient by institutional workers. The rethermalization unit should include provision for isolated storage of soiled trays in a refrigerated state to inhibit spoilage of leftover food items, to inhibit contamination of unserved meals by soiled food items, and to enable institutional workers to collect all of the soiled trays at the end of the day, thereby further enhancing efficiency.

With regard to the foregoing and other objects, the present invention provides a refrigeration and rethermalization apparatus for maintaining food items placed on meal serving trays, including hot food items to be served at an elevated temperature, in a refrigerated state and rethermalizing the hot food items at a desired time prior to meal serving. The apparatus includes a cabinet having a front, a back, a top, and a bottom. The cabinet further includes an upper tray storage compartment for storing meal serving trays containing hot and cold food items in a refrigerated state, and a lower tray storage compartment for storing soiled meal serving trays in a refrigerated state to inhibit spoilage of soiled food items left thereon. A divider physically and atmospherically isolates the upper tray storage compartment from the lower tray storage compartment and inhibits contamination of food items stored in the upper compartment by soiled trays stored in the lower compartment. One or more doors adjacent the front of the cabinet provide access to the upper and lower tray storage compartments. A refrigerator provides refrigeration to the upper and lower compartments. The apparatus also provides means for heating or rethermalizing a hot food item positioned on a tray in the upper tray storage compartment.

The upper tray storage compartment may be further divided into a rethermalization compartment for heating hot food items. The rethermalization compartment is defined by a fixed thermal barrier. If desired, a plurality of rethermalization compartments may be provided in the upper compartment by use of multiple thermal barriers.

In combination with use of a rethermalization compartment as described above, the refrigerator includes a compressor-condensing unit for producing compressed refrigerant. A first cold plate receives and expands the compressed refrigerant to maintain the rethermalization compartment in a refrigerated state. A second cold plate also receives and expands compressed refrigerant to maintain the upper and lower compartments in a refrigerated state. During rethermalization, operation of the first cold plate is disabled and the means for heating is turned on to enable rethermalization of a hot food item positioned in the rethermalization compartment. If desired, one or more blowers may be employed to circulate refrigerated air within the tray storage compartments.

Various means for heating hot food items may be employed in accordance with the invention, including conduction heating, convection heating, radiant heating, induction heating, and any combination thereof. For example, heating of hot food items may be achieved by positioning resistive heating elements above and below hot food items in the rethermalization compartment. As another example, a heater shelf having one or more heaters for selectively heating one or more hot food items may also be employed in accordance with the invention.

A tray docking sensor may be included to sense the presence or absence of a meal serving tray in the upper compartment. The tray docking sensor outputs a signal corresponding to the position of the tray. A microcomputer control system receives the tray docking signal and prevents operation of the means for heating when the signal indicates that a tray is not present.

Other features which may be employed in accordance with the invention include a user interface for controlling operation of the apparatus, a communications port connected to the microcomputer control system to enable the apparatus to communicate with a peripheral device (such as a computer for use in networking a plurality of like apparatuses), a movable tray support shelf positioned on the outside of the apparatus to support a meal serving tray during consumption of a meal contained thereon, a removable tray handling cassette for supporting meal serving trays in the lower tray storage compartment, and a plurality of rollers for enhancing transport of the apparatus.

The present invention also provides an apparatus for the cold storage and rethermalization of a day's worth of meals (i.e., breakfast, lunch, and dinner) for an individual with each meal including hot and cold food items and being placed on a meal serving tray as described above. In this manner, the apparatus is particularly useful as a bedside appliance which can be conveniently placed, for example, in the room of a hospital patient. The apparatus includes a refrigeration-rethermalization cart having upper and lower tray storage compartments for storing no more than three meal serving trays. The apparatus also includes a barrier for physically and atmospherically isolating the two compartments, at least one door for accessing the compartments, a refrigerator for refrigerating the compartments, means for heating a hot food item in the upper compartment, and a microcomputer control system for controlling operation of the apparatus, all as described above.

BRIEF DESCRIPTION OF THE DRAWING

The above and other features, aspects and advantages of the present invention will now be discussed in the following detailed description and appended claims considered in conjunction with the accompanying drawings in which:

FIG. 2 is a front view of the cabinet of FIG. 1 with the doors removed, showing the upper and lower tray storage compartments with the upper tray storage compartment including a rethermalization compartment defined by a thermal barrier;

FIG. 3 is a functional block diagram of a refrigeration system according to the invention;

FIGS. 4A–C provide various views of a meal serving tray having a hot food section and a cold food section in accordance with the invention;

DETAILED DESCRIPTION OF PREFERRED EMBODIMENTS

Figure 1:
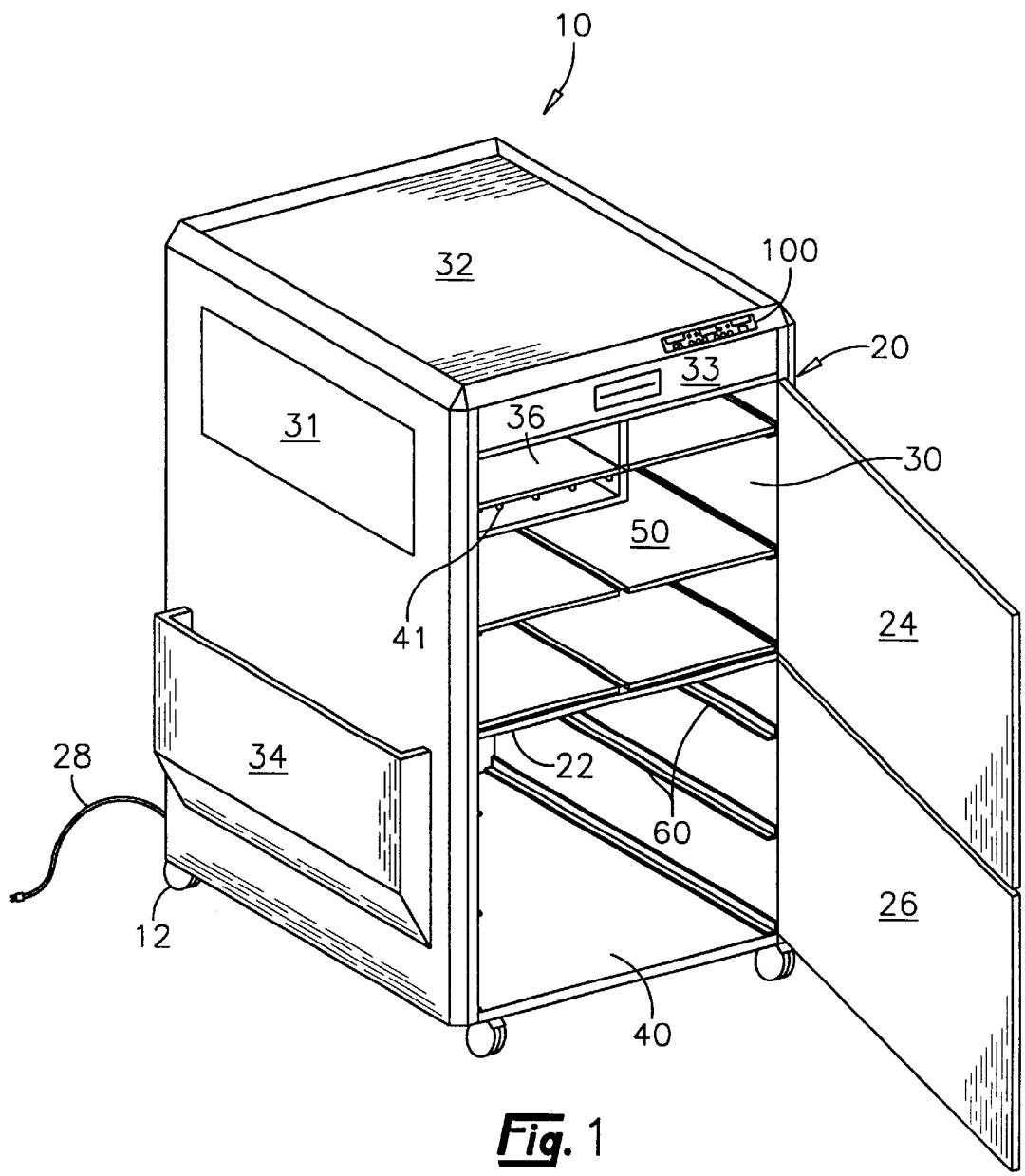
FIG. 1 is a perspective view of a bedside rethermalization cart in accordance with the invention, the cart including a cabinet configured for storing trays of prepared meals in a refrigerated state in an upper tray storage compartment of the cabinet, a single rethermalization compartment within the upper compartment for rethermalizing hot food items on one of the trays at a selected time prior to meal serving, and a lower tray storage compartment for storing soiled trays in a refrigerated state in physical isolation from the upper compartment to inhibit contamination of uneaten meals in the upper compartment.

With reference now to the drawings in which like reference characters designate like or similar parts throughout the several views, FIG. 1 illustrates a perspective view of a refrigeration and rethermalization cart 10 for maintaining food items placed on meal serving trays, including hot food items to be served at an elevated temperature, in a refrigerated state and rethermalizing the hot food items at a desired time prior to meal serving. In a preferred embodiment, the cart 10 is provided with a plurality of rollers 12, such as castered wheels, to facilitate movement of the cart 10. The cart 10 includes a cabinet 20 for storing meal serving trays, a refrigerator for refrigerating the cabinet 20, and a heater for rethermalizing or heating food items that are to be served at an elevated temperature. A control panel 100 located at the front of the cart 10 provides a user interface for controlling refrigeration and rethermalization cycles. The control panel 100 also provides the user with various status indications. A utility drawer 33 is also provided for storage of items such as silverware, napkins, and packaged condiments.

A divider 22 physically separates the cabinet 20 into two meal serving tray storage compartments, including an upper meal serving tray storage compartment 30 and a lower meal serving tray storage compartment 40. In a preferred embodiment, the divider 22 includes an insulating material sandwiched between two sheets of stainless steel. The upper tray storage compartment 30 is further divided to include a rethermalization compartment 36 for rethermalizing or heating hot food items at a desired time prior to meal serving. Preferably, two access doors 24 and 26 located on the front of the cart 10 provide access to respective tray storage compartments 30, 40. Alternatively, a single door provides access to both tray storage compartments 30, 40.

Figure 9:
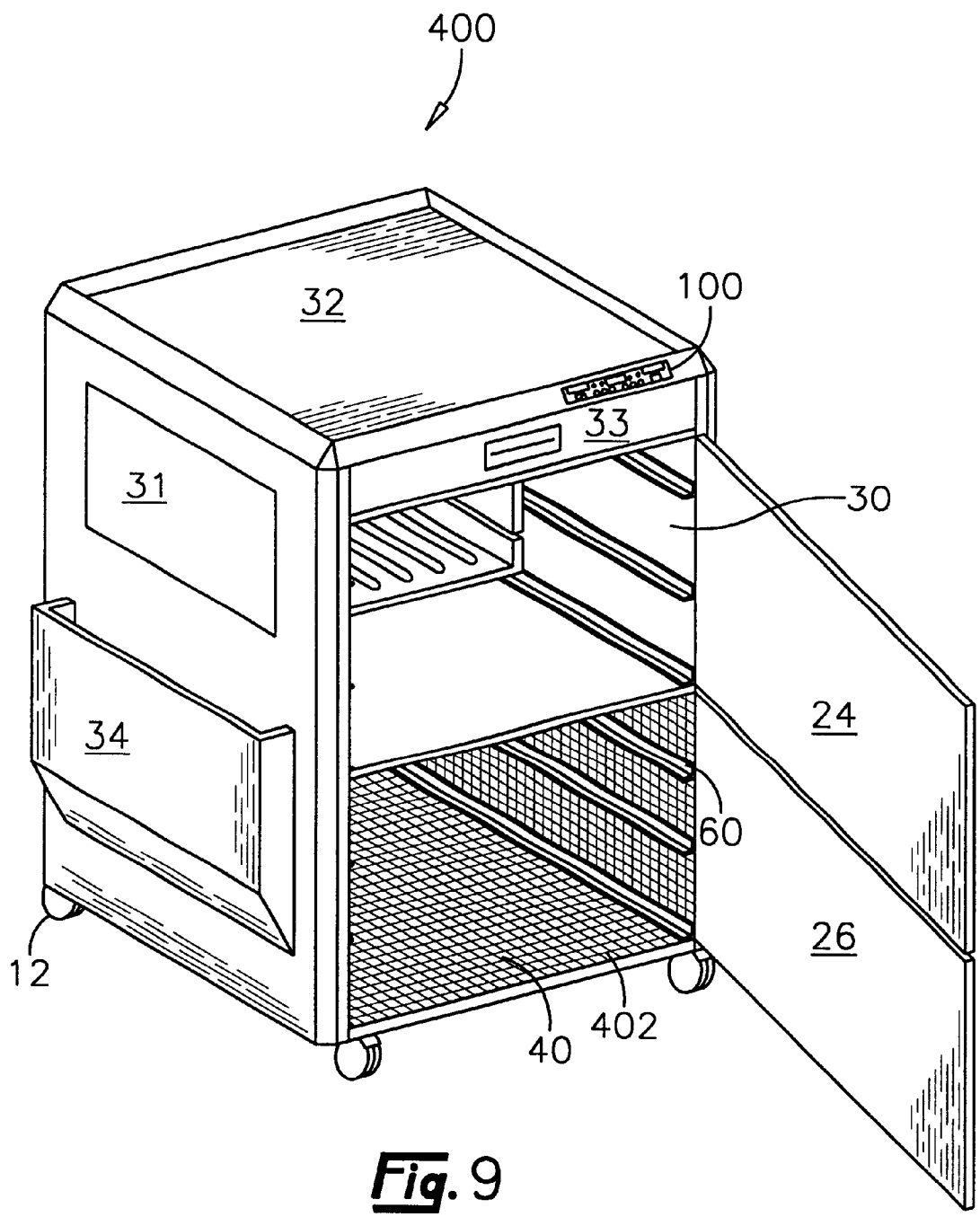
FIG. 9 is a perspective view of a bedside rethermalization cart similar to that shown in FIG. 1, configured to accommodate a tray handling cassette in the lower tray storage compartment.

Each of the tray storage compartments 30, 40 is equipped with tray supports 60 arranged to support the outer edges of the trays 50. In the preferred embodiment of FIG. 1, the tray supports 60 are attached to opposed inner walls of the tray storage compartments 30, 40 to allow for vertical stacking of trays 50 while maintaining sufficient separation between adjacent trays 50 to prevent interference with food items and food containers positioned on the trays 50. In another preferred embodiment shown in FIG. 9, tray supports 60 for the lower tray storage compartment 40 are attached to a tray handling cassette 402. The cassette 402, which is preferably constructed of a wire mesh, is lightweight and removable.

The cabinet 20 is configured to store a day's worth of meals (breakfast, lunch, and dinner) for a single individual. The meals (including hot food items and cold food items) are prepared, placed on meal serving trays 50, and the trays 50 placed in the upper tray storage compartment 30. After meals have been served, the soiled trays 50 are placed in the lower tray storage compartment 40 which is refrigerated to inhibit spoilage of leftover food items. With reference to the embodiment of FIG. 9, when the lower tray storage compartment 40 is filled with soiled trays, the cassette 402 and trays can be removed as a single unit and transported to the central processing area for clean up. After clean up, the cassette 402 can be loaded with freshly prepared meal trays and transported back to the cart 400 where the meal trays are removed from the cassette 402 and placed in the upper tray storage compartment 30. The empty cassette 402 is placed in the lower tray storage compartment 40 until the end of the day when its full load of soiled trays is again removed for clean up. The cassette 402 may also be set on wheels or rollers to reduce the amount of effort required to move the cassette 402 in and out of the lower tray storage compartment 40.

Divider 22 functions to inhibit contamination of uneaten meals in the upper tray storage compartment by soiled trays in the lower tray storage compartment 40. The divider 22 inhibits contamination of uneaten meals in two ways: (1) physically, by inhibiting direct contact between soiled meal trays and uneaten meal trays; and (2) atmospherically, by creating compartments 30, 40 which are atmospherically separated to inhibit transfer of air-borne contaminants between the two compartments 30, 40. The soiled trays 50 are stored in the lower tray storage compartment 40 until the end of the day when all of the soiled trays 50 are removed for cleaning. Thus, it will be appreciated that the cart 10 is particularly useful when placed, for example, in the room of a hospital patient so that the patient's meals can be safely and efficiently stored and served during the day. For convenience, a pull-down side shelf 31 (shown in its stowed position in FIG. 1) is built into the side of the cart 20 to provide a stable platform for supporting a meal tray 50 as the meal contained thereon is consumed by the patient.

Although not required, the cart 20 is configured to provide utility additional to meal servicing. For example, the top surface 32 of the cart 20 is recessed to support objects such as flowers and a clock, and thereby functions as a convenient bedside stand for a patient. A magazine storage pocket 34 is also provided to help organize the patient's reading materials.

In a preferred embodiment, the cart 10 is supplied with 110 volt electrical power via power cable 28. Alternatively, the cart 10 is configured for operation with other levels of electrical power. The cart 10 is simply plugged into an appropriate electrical wall outlet.

FIG. 2 provides a front view of the cabinet 20 with the upper tray storage compartment 30, the lower tray storage compartment 40, the rethermalization compartment 36, and the divider 22 clearly visible. In a preferred embodiment, the upper and lower tray storage compartments 30, 40 are refrigerated by an evaporator plate or cold plate 42 containing evaporator coils. Preferably, no refrigeration blowers are used. However, if desired, blowers may be employed to assist in refrigeration and/or rethermalization, as illustrated by blower 45 for circulating air within the rethermalization compartment 36, blower 47 for circulating air within the upper tray storage compartment 30, and blower 49 for circulating air within the lower tray storage compartment 40. Cold plate 42 preferably covers substantially the entire area of one side of the cabinet 20 (such as the right side as shown in FIG. 2) from top to bottom and front to back. If needed or desired, additional cold plates may be provided at the left side, top, bottom or back of the cabinet 20.

With continued reference to FIG. 2, the rethermalization compartment 36 is defined by a thermal barrier 35 which extends from the front to the back of the cabinet 20. The thermal barrier 35 is filled with an insulating material, such as an insulating foam, to withstand both hot and cold temperatures within the rethermalization and upper tray storage compartments 36, 30. Tray supports 60' and 60" are included to support opposed ends of a meal serving tray 50 (FIG. 1).

Referring now to FIGS. 4A–C, a preferred tray 50 for the cabinet 20 of FIG. 2 is one that can be used for loading both hot and cold food items into the cabinet 20. The tray 50 includes a cold food side 52 which is loaded with cold food items and a hot food side 54 which is loaded with hot food items. At the midpoint of the tray 56 is a flat ridge 58 which enables the tray 50 to slide into a gap 43 formed in the thermal divider 35 (as shown in FIG. 2) so that the tray 50 is supported by the thermal divider 35 and corresponding tray guides 60', 60" positioned along the outer walls of the upper tray storage compartment 30. The tray ridge 58 is configured to substantially completely fill the gap 43, thus maintaining thermal separation between the rethermalization compartment 36 and the remaining portion of the upper tray storage compartment 30. With the tray 50 in place, cold food items that have been loaded onto the cold food side 52 of the tray 50 are positioned within the upper tray storage compartment 30 and hot food items on the hot food side 54 are positioned in the rethermalization compartment 36.

Hot food items placed in the rethermalization compartment 36 are maintained in a refrigerated state by a second cold plate, as generally shown by evaporator coils 38. The evaporator coils of cold plate 38 preferably extend along the top, bottom, and back of the rethermalization compartment 36. Hot food items in the rethermalization compartment 36 are refrigerated by cold plate 38 until, at a desired time prior to meal serving (for example, 30 minutes), refrigerant flow to the cold plate 38 is turned off and electricity flow to two resistive heating elements 39 and 41 within the rethermalization compartment 36 is turned on. An upper resistive heating element 39 is positioned above the hot food items to be heated and a lower resistive heating element 41 is positioned below the hot food items. The heating elements 39, 41 radiate heat within the rethermalization compartment 36 which in turn convectively rethermalizes the hot food items.

Shown in FIG. 3 is a functional block diagram of a refrigerator according to the invention. An onboard compressor/condensing unit 70 supplies compressed refrigerant to the refrigerator cold plate 42 and the rethermalization cold plate 38. During rethermalization, a solenoid valve 72 is closed to prevent the flow of refrigerant to the rethermalization cold plate 38 while solenoid valve 74 remains open so that the upper and lower tray storage compartments 30, 40 remain in a refrigerated state. Solenoid valve 74 functions to control refrigeration temperatures by controlling the flow of compressed refrigerant to the refrigeration cold plate 42.

It will be appreciated that use of cold plates 38, 42 (without blowers) in a preferred embodiment of the invention provides several advantages over a refrigeration system which uses blowers to circulate refrigerated air. For example, cold plates 38, 42 cause little if any air movement within the tray storage compartments 30, 40. This has the advantage of inhibiting contamination of uneaten meals placed in the upper tray storage compartment 30 by soiled trays in the lower tray storage compartment 40 since air within the lower compartment 40 is not circulated through the upper compartment 30. Cold plates 38, 42 also simplify the cart 10 by eliminating blowers, ducting and other hardware that would otherwise add to the cost and complexity of the cart 10. As a further advantage, cold plates 38, 42 eliminate the noise associated with refrigeration blowers.

Figure 5:
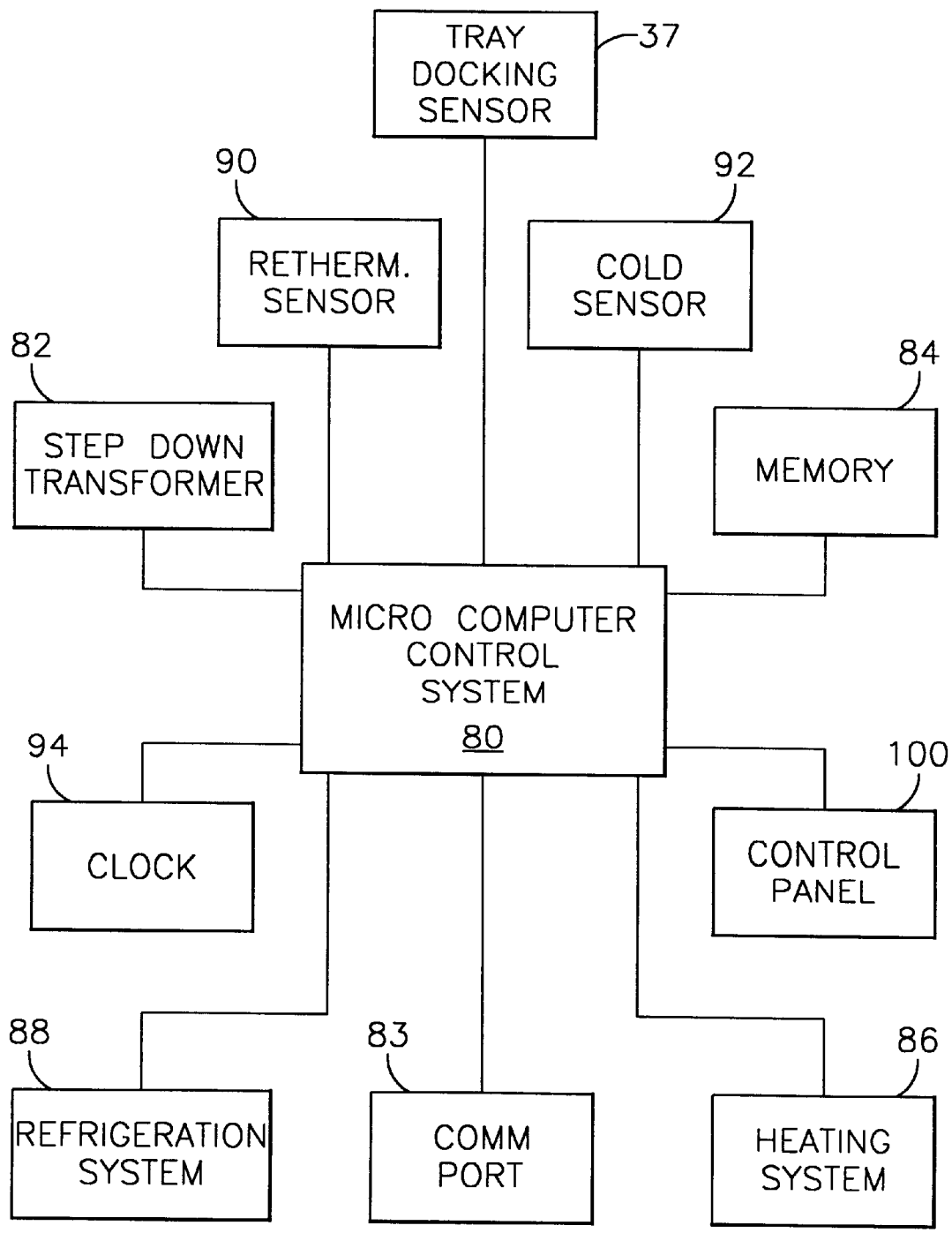
FIG. 5 is a functional block diagram of a control system according to the invention.

A preferred embodiment of a control system for the cart 10 will now be described. Shown in FIG. 5 is a functional block diagram of a control system, which includes a programmed microcomputer control system 80 for controlling operation of the cart 10. A communications port 83 enables the microcomputer control system 80 to communicate with a peripheral device, such as a base computer for networking a plurality of carts 10. The microcomputer control system 80 preferably includes a primary microprocessor and two secondary microprocessors which control operation of the heating system 86 and refrigeration system 88. However, it will be understood that the hierarchy of the microcomputer control system 80 can take many forms, including a hierarchy that employs a single microprocessor which performs all control functions.

Figure 6:
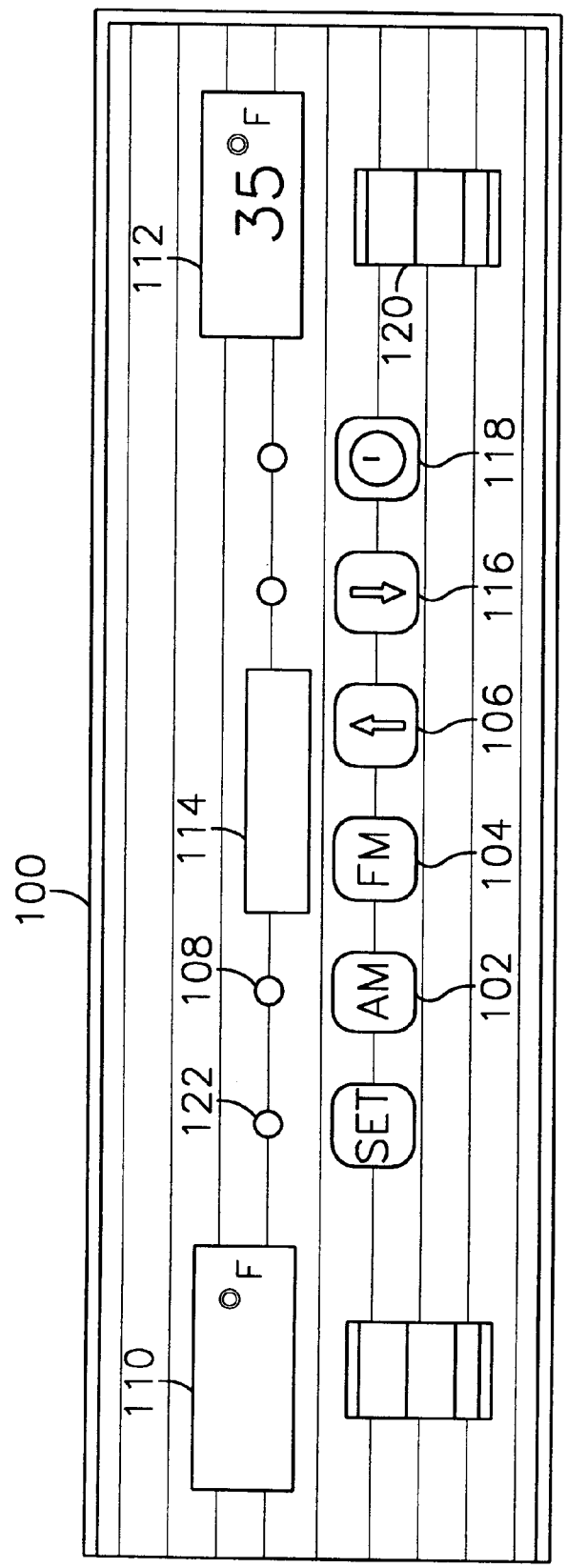
FIG. 6 is a plan view of a control panel for a cart in accordance with the invention.

As seen in FIG. 5, electrical power/voltage provided to the cart 10 is stepped down by a step down transformer 82 and the stepped down voltage is used to power the microcomputer control system 80. An electronic memory 84 is provided for storage of programing and data needed for operation of the cart 10, including programming associated with rethermalization start and stop times, rethermalization temperature levels, and other programming as may be needed. The output of a tray docking switch 37 (see also FIG. 2) positioned to sense the presence of a meal serving tray 50 at tray supports 60' and 60" and at gap 43 (hereinafter referred to as the "rethermalization slot") is provided to the microcomputer 80. When the tray docking switch output indicates that a tray 50 is present in the rethermalization slot, the microcomputer control system 80 informs the user that a tray 50 is positioned for rethermalization by illuminating a "Tray Present" indicator 122 at the control panel 100, as shown in FIG. 6. Additionally, in a preferred embodiment, the microcomputer control system 80 prevents operation of the heating system 86 when the tray docking switch 37 indicates that no tray 50 is present at the rethermalization slot. If desired, a door position sensor may be employed to sense the position of the upper door 24 so that the microcomputer control system 80 can prevent operation of the heating system 86 when the door 24 is open.

If desired, the microcomputer control system 80 can be configured so that a user can program refrigeration and rethermalization time and temperature settings in accordance with any desired heating profile. However, in the interest of simplifying operation of the cart 10 for a user, a preferred embodiment of the microcomputer control system 80 includes three temperature/duration modes for heating food items located in the rethermalization compartment 36. These three modes include an "AM Mode" for rethermalizing morning meals, a "PM Mode" for rethermalizing lunch and evening meals, and a manual "Boost Mode" for maintaining foods in a rethermalized state. A rethermalization temperature sensor 90 (see also FIG. 2) provides a temperature feedback signal to the microcomputer control system 80 to enable single temperature heating (preferably between 250° F.–300° F.) throughout the duration of each mode. The AM and PM modes are set to start automatically at preset time (such as 30 minutes prior to meal serving). Additionally, each mode can be manually initiated by a user.

Default settings are preferably programmed into the microcomputer control system 80 and stored in memory 84. The AM Mode default is 250° F. for 30 minutes, the PM Mode defaults to 275° F. for 50 minutes, and the Boost Mode is for 5 minutes at 275° F. A clock 94 provides the necessary timing signals to the microcomputer control system 80.

With reference now to the control panel 100 shown in FIG. 6, manual selection of the AM, PM, and Boost modes can be made with the push of a single button. For example, to manually select AM Mode, the user simply pushes the AM Manual Start button 102. Manual selection of PM Mode can be made with button 104, and Boost Mode is selected with button 106. During a rethermalization cycle, a "Retherm In Progress" light 108 is illuminated, and the temperature sensed by the rethermalization sensor 90 is displayed at a dedicated rethermalization temperature display 110. A dedicated cold temperature display 112 provides a continuous display of the temperature sensed by a cold temperature sensor 92 (FIGS. 2 and 5), which senses the temperature of the upper tray storage compartment 30. Alternatively, a temperature sensor 96 positioned in the lower compartment 40 may be employed to provide an indication at display 112. Display 114 communicates various other information to a user, such as the existence of a failure condition and information used for programming setpoints into the microcomputer control system 80 by a user.

The user may cancel a rethermalization cycle by pushing the "Cancel Cycle" button 116. At the completion of a rethermalization cycle, an aural alarm is sounded. Pushing the "Alarm Cancel" button 118 silences the alarm. The aural alarm is also sounded to indicate an anomalous condition, such as when electrical power is interrupted or when the tray docking sensor 37 indicates that no tray 50 is present at the rethermalization slot when a rethermalization cycle is set to begin. Also, if a tray 50 is removed from the rethermalization slot during rethermalization, power to the heating system 86 is removed and timing for the rethermalization program is halted. Once the tray 50 is replaced in the rethermalization slot, the microcomputer control system 80 reinitiates the supply of electrical power to the heating system 86 to complete the rethermalization program. ON/OFF switch 120 enables the user to turn the cart 10 ON and OFF.

In a typical operation, food items (hot and cold) for each meal (breakfast, lunch and dinner) are prepared at a central food processing facility or kitchen, placed on the trays 50, and the trays 50 loaded onto a transport cart which delivers the meals to the carts 10 placed in the patients' rooms. The trays 50 are stored in the cart 10 in a refrigerated state with the breakfast tray first positioned in the rethermalization slot. At the preselected start time, the microcomputer control system 80 causes solenoid valve 72 (FIG. 3) to close so that refrigerant no longer flows to the rethermalization cold plate 38. With refrigeration to the rethermalization compartment 36 turned off, the microcomputer control system 80 causes heating elements 39, 41 to turn on and begin radiating heat throughout the rethermalization compartment 36. Since no heater blowers are employed in the preferred embodiment shown in FIG. 1, the cart 10 relies on natural convection and radiant heat to rethermalize hot food items. If desired, however, a blower 45 may be provided to assist in rethermalization.

Temperatures (both hot and cold) are controlled automatically by the rethermalization sensor 90 and the cold sensor 92 (FIG. 5). There are no dials to set or turn. Temperatures are pre-set to a desired level, which in a preferred embodiment is 35° F. for refrigeration and 250° F.–300° F. for rethermalization. However, as previously described, the operator may reprogram the rethermalization cycle times and temperatures as desired.

After rethermalization is complete and the meal is ready to be served, a "Meal Ready" light will illuminate on the control panel 100 to provide an indication to the user. The meal is then removed from the rethermalization slot and served, and the next meal of the day is moved from one of the lower storage slots in the upper compartment 30 to the rethermalization slot at the top of the upper compartment 30. After the rethermalized meal is consumed, the soiled dishes, eating utensils (fork, spoon, knife, etc.), and any leftover food items are placed on the tray 50 and the soiled tray is placed in refrigerated storage in the lower tray storage compartment 40. At the end of the day after all meals have been served, the soiled trays are retrieved for cleaning, at which time freshly prepared meal serving trays 50 for the next day may be loaded into the upper tray storage compartment 30. Thus, it will be appreciated that the preparation, serving, and clean up of large numbers of meals in institutional settings is greatly simplified by the invention.

Figure 7:
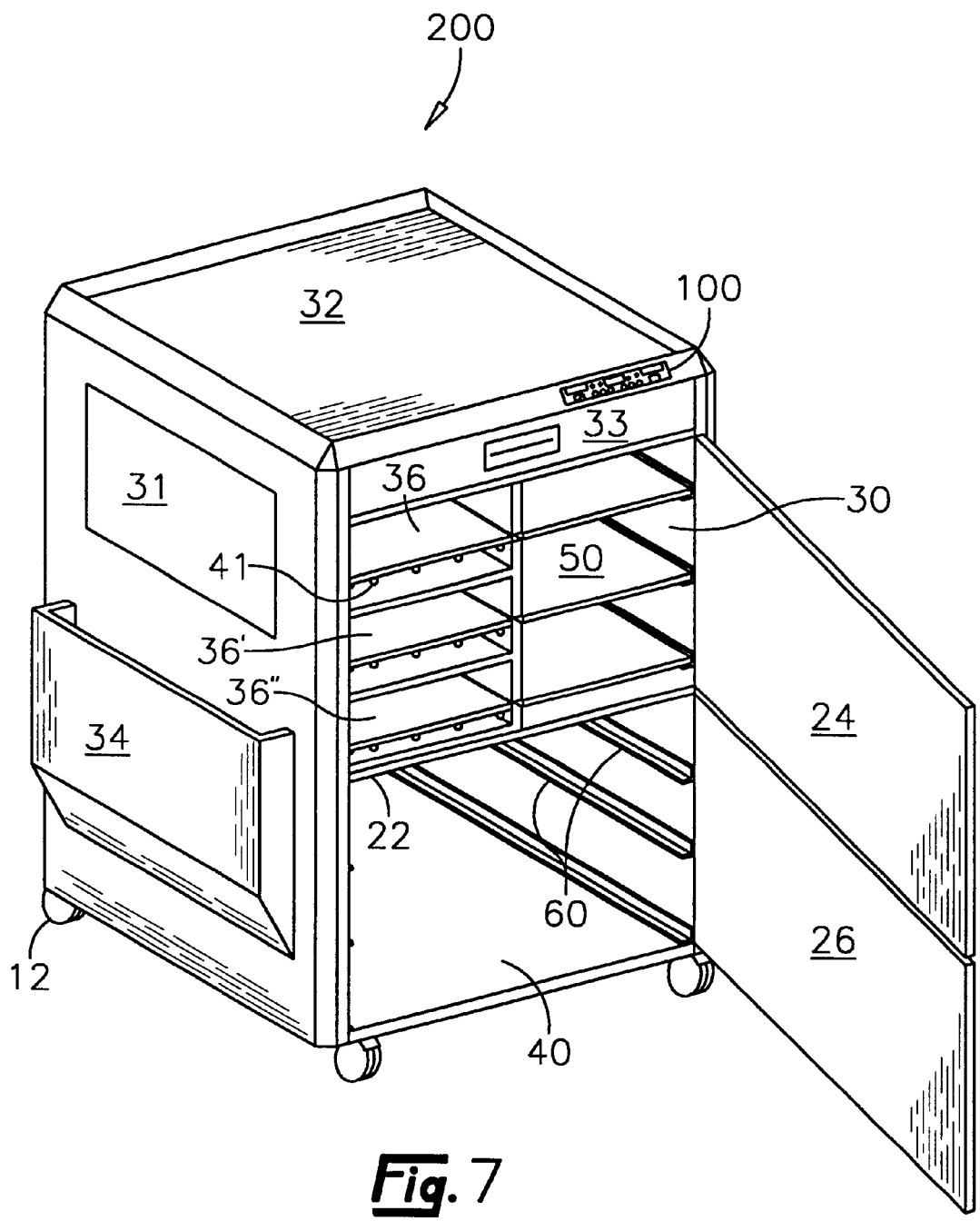
FIG. 7 is a perspective view of an alternate embodiment of a bedside rethermalization cart in accordance with the invention, which includes a plurality of rethermalization compartments defined by thermal barriers.

FIG. 7 shows an alternate embodiment of a cart 200 according to the invention, which includes three rethermalization compartments 36, 36', and 36" located in the upper tray storage compartment 30. In the embodiment of FIG. 7, the user does not need to move meal serving trays 50 to a rethermalization slot since all three meal serving trays 50 occupy rethermalization slots. The microcomputer control system 80 for this embodiment can be programmed (or manually initiated by the user) to rethermalize one or more meals at the same time.

Figure 8:
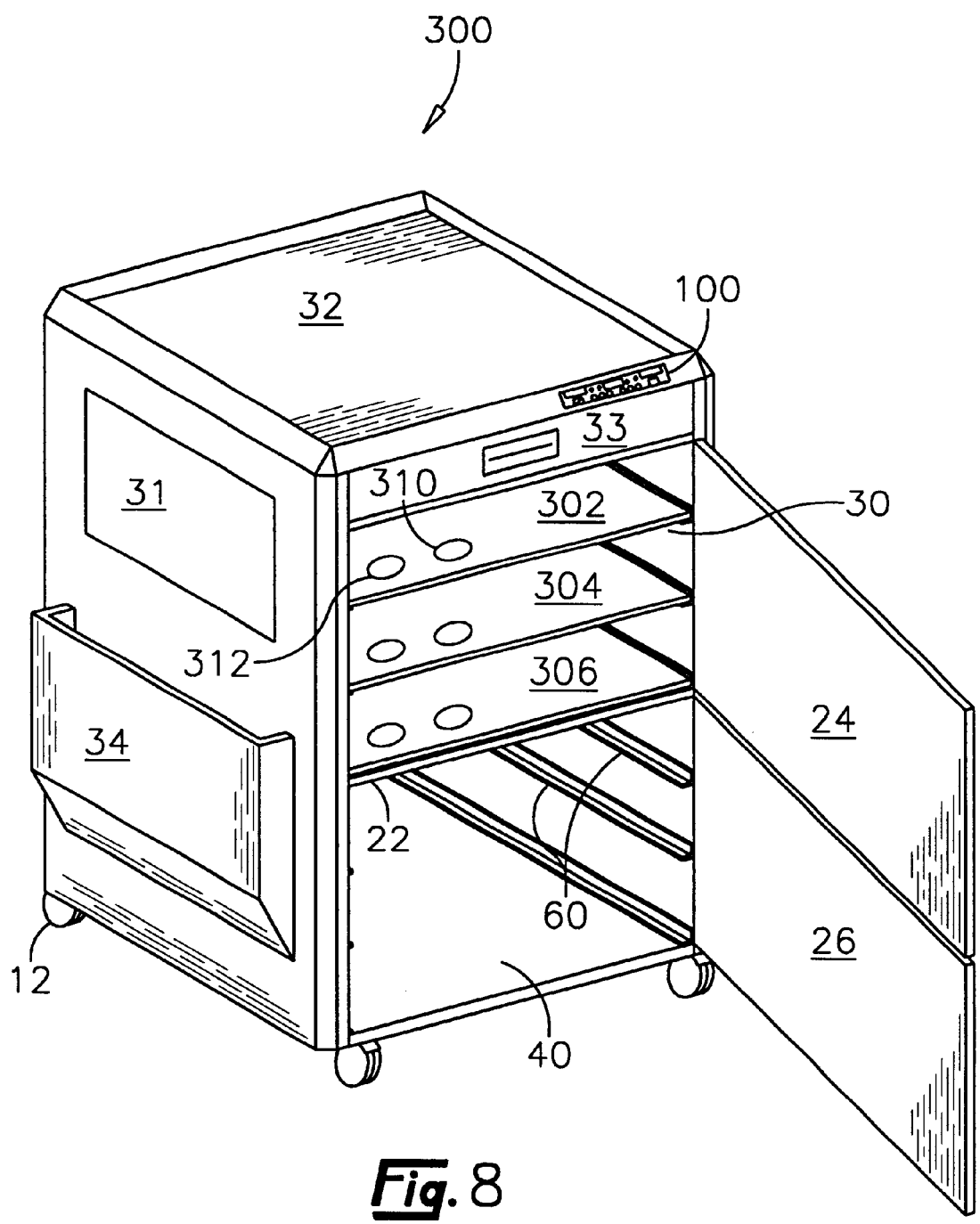
FIG. 8 is a perspective view of an alternate embodiment of a bedside rethermalization cart in accordance with the invention, which includes a plurality of heater shelves with heating elements for use in rethermalizing hot food items positioned on meal serving trays supported by the heater shelves.

FIG. 8 shows a further alternate embodiment of a cart 300 according to the invention which employs three heater shelves 302, 304, and 306 for supporting meal serving trays in the upper tray storage compartment 30. Since there are no separate rethermalization compartments in the cart 300, there is no need for a dedicated rethermalization cold plate 38 as described above with reference to FIGS. 1 and 2. Each heater shelf includes one or more heating elements, such as heating elements 310 and 312, for conductively heating hot food items which are positioned on the trays above the heating elements 310, 312. A detailed description of a preferred meal serving tray for use in connection with the cart 300 of FIG. 8 is provided in U.S. Pat. No. 5,454,427 to Westbrooks et al., issue date Oct. 3, 1995, the entire contents of which are hereby incorporated by reference. Briefly, the tray is provided with special holders which extend below the bottom of the tray so that when covered dishes, or containers containing hot food items are positioned in the special holders, the containers are in contact with the heating elements 310, 312. Thus, when the heating elements 310, 312 are turned on, hot food items within the containers contacting the heating elements 310, 312 will be rethermalized.

It is contemplated, and will be apparent to those skilled in the art from the foregoing specification, drawings, and examples that modifications and/or changes may be made in the embodiments of the invention. For example, while a preferred embodiment of the invention described above includes castered wheels 35 to enhance mobility of the cabinet 20 and its associated on-board heating and refrigeration systems, it will be understood that the invention may be employed in the form of a stationary or fixed position cabinet. Additionally, while the above preferred embodiments are primarily directed to rethermalization of hot food items by means of convection, conduction, and radiant heating, it will be understood that other forms of heating may be employed in accordance with the invention, including induction heating. Accordingly, it is expressly intended that the foregoing are illustrative of preferred embodiments only, not limiting thereto, and that the true spirit and scope of the present invention be determined by reference to the appended claims.

What is claimed is:

1. A refrigeration and rethermalization apparatus for maintaining food items placed on meal serving trays, including hot food items to be served at an elevated temperature, in a refrigerated state and rethermalizing the hot food items at a desired time prior to meal serving, the apparatus comprising:

a cabinet having a front, a back, a top, and a bottom, said cabinet including:
an upper tray storage compartment for storing meal serving trays containing hot and cold food items in a refrigerated state;
a lower tray storage compartment for storing soiled meal serving trays in a refrigerated state to inhibit spoilage of soiled food items left thereon; and
a divider for physically and atmospherically isolating the upper tray storage compartment from the lower tray storage compartment and inhibiting contamination of food items stored in the upper tray storage compartment by soiled trays stored in the lower tray storage compartment;
at least one door adjacent the front of the cabinet for accessing the upper and lower tray storage compartments;
a refrigerator for refrigerating the upper and lower tray storage compartments; and
means for heating a hot food item positioned on a tray in the upper tray storage compartment.

2. The apparatus of claim 1 wherein said upper tray storage compartment includes a rethermalization compartment for heating a hot food item positioned on a tray, said rethermalization compartment including a fixed thermal barrier for thermally isolating hot food items on a tray from cold food items on the same tray.

3. The apparatus of claim 2 wherein said means for heating includes:
a first resistive heating element positioned below hot food items in the rethermalization compartment; and
a second resistive heating element positioned above hot food items in the rethermalization compartment.

4. The apparatus of claim 2, further including a plurality of rethermalization compartments positioned in the upper tray storage compartment.

5. The apparatus of claim 1 wherein said means for heating includes a heater shelf having one or more heaters for selectively heating one or more hot food items.

6. The apparatus of claim 1 wherein said refrigerator includes:
a compressor-condensing unit for producing compressed refrigerant; and
an evaporator plate for expanding compressed refrigerant produced by the compressor-condensing unit and refrigerating the upper and lower tray storage compartments.

7. The apparatus of claim 1 wherein said at least one door includes:
a first door for accessing the upper tray storage compartment; and
a second door for accessing the lower tray storage compartment.

8. The apparatus of claim 1, further including a blower for circulating air within the upper tray storage compartment.

9. The apparatus of claim 1, further including a blower for circulating air within the lower tray storage compartment.

10. The apparatus of claim 1, further including a user interface for controlling operation of the apparatus.

11. The apparatus of claim 1, further including a plurality of rollers for enhancing transport of the apparatus.

12. The apparatus of claim 1, further including a microcomputer control system for controlling operation of the apparatus, including said means for heating.

13. The apparatus of claim 12 wherein said refrigerator includes:
a compressor-condensing unit for producing compressed refrigerant;
a first cold plate for expanding compressed refrigerant and maintaining said rethermalization compartment in a refrigerated state;
a second cold plate for expanding compressed refrigerant and maintaining the upper and lower tray storage compartments in a refrigerated state; and
wherein said microcomputer control system is further operable to disable operation of the first cold plate and to enable operation of said means for heating to rethermalize a hot food item at a predetermined time prior to meal serving.

14. The apparatus of claim 12, further including a tray docking sensor for sensing the presence of a meal serving tray in the upper tray storage compartment and producing a tray docking signal corresponding to whether the tray is present, said microcomputer control system receiving the tray docking signal and preventing operation of said means for heating when the tray docking signal indicates that a tray is not present.

15. The apparatus of claim 12, further including a communications port connected to said microcomputer control system to enable the apparatus to communicate with a peripheral device.

16. The apparatus of claim 1, further including a movable tray support shelf for supporting a meal serving tray external to said cabinet.

17. The apparatus of claim 1, further including a removable tray handling cassette for supporting meal serving trays in said lower tray storage compartment.

18. An apparatus for the cold storage and rethermalization of a day's worth of meals for an individual with each meal being placed on a meal serving tray and including hot food items to be served at an elevated temperature and cold food items to be served at a refrigerated temperature, said apparatus including:
   a refrigeration-rethermalization cart including:
      an upper tray storage compartment for storing no more than three meal serving trays containing hot and cold food items in a refrigerated state;
      a lower tray storage compartment for storing no more than three soiled meal serving trays in a refrigerated state to inhibit spoilage of soiled food items left thereon;
      a divider for physically and atmospherically isolating the upper tray storage compartment from the lower tray storage compartment and inhibiting contamination of food items stored in the upper tray storage compartment by soiled trays stored in the lower tray storage compartment;
      at least one door for accessing the upper and lower tray storage compartments;
      a refrigerator for refrigerating the upper and lower tray storage compartments;
      means for heating a hot food item positioned on a tray in the upper tray storage compartment; and
      a microcomputer control system for controlling operation of the apparatus, including said means for heating.

19. The apparatus of claim 18 wherein said refrigerator includes:
   a compressor-condensing unit for producing compressed refrigerant; and
   an evaporator plate for expanding compressed refrigerant produced by the compressor-condensing unit and refrigerating the upper and lower tray storage compartments.

20. The apparatus of claim 18 wherein said upper tray storage compartment includes a rethermalization compartment for heating a hot food item positioned on a tray, said rethermalization compartment including a fixed thermal barrier for thermally isolating hot food items on a tray from cold food items on the same tray.

21. The apparatus of claim 20 wherein said means for heating includes:
   a first resistive heating element positioned below hot food items in the rethermalization compartment; and
   a second resistive heating element positioned above hot food items in the rethermalization compartment.

22. The apparatus of claim 20 wherein said refrigerator includes:
   a compressor-condensing unit for producing compressed refrigerant;
   a first cold plate for expanding compressed refrigerant and maintaining said rethermalization compartment in a refrigerated state;
   a second cold plate for expanding compressed refrigerant and maintaining the upper and lower tray storage compartments in a refrigerated state; and
   wherein said microcomputer control system is further operable to disable operation of the first cold plate and to enable operation of said means for heating to rethermalize a hot food item at a predetermined time prior to meal serving.

23. The apparatus of claim 20, further including a plurality of rethermalization compartments positioned in the upper tray storage compartment.

24. The apparatus of claim 18, further including a tray docking sensor for sensing the presence of a meal serving tray in the upper tray storage compartment and producing a tray docking signal corresponding to whether the tray is present, said microcomputer control system receiving the tray docking signal and preventing operation of said means for heating when the tray docking signal indicates that a tray is not present.

25. The apparatus of claim 18, further including a communications port connected to said microcomputer control system to enable the apparatus to communicate with a peripheral device.

26. The apparatus of claim 18, further including a removable tray handling cassette for supporting meal serving trays in said lower tray storage compartment.

* * * * *